United States Patent

Schuster et al.

[11] 3,927,295
[45] Dec. 16, 1975

[54] WELDING SYSTEM

[75] Inventors: Joachim Schuster; Hermann Seien, both of Oberhausen, Germany

[73] Assignee: Babcock & Wilcox, Limited, London, England

[22] Filed: Feb. 1, 1974

[21] Appl. No.: 438,833

[52] U.S. Cl. .......... 219/125 R; 219/60 A; 219/60 R
[51] Int. Cl.² .......................................... B23K 9/12
[58] Field of Search ............ 219/60 A, 60 R, 125 R, 219/125 PL

[56] References Cited
UNITED STATES PATENTS

| | | |
|---|---|---|
| 2,260,260 | 10/1941 | Mikesh .............................. 219/60 R |
| 3,031,566 | 4/1962 | Wuesthoff ..................... 219/60 R X |
| 3,035,157 | 5/1962 | Armstrong et al. ............. 219/125 R |
| 3,064,120 | 11/1962 | Ache .............................. 219/125 R |
| 3,207,408 | 9/1965 | Thome et al. ................ 219/125 R X |
| 3,841,547 | 10/1974 | Bartley ........................... 219/125 R |

*Primary Examiner*—J. V. Truhe
*Assistant Examiner*—N. D. Herkamp
*Attorney, Agent, or Firm*—J. M. Maguire

[57] ABSTRACT

A welding system for the welding of tube ends to tube sheets preferably having a thrust bearing and a welding head mounted on a spindle wherein the thrust bearing includes a plurality of axially projecting spikes for fixing the spindle to the tube sheet.

4 Claims, 3 Drawing Figures

WELDING SYSTEM

This invention relates to an arc welding apparatus for the welding of tube faces to tube sheets and more particularly to an apparatus having a welding head and a centering pin mounted on a rotating spindle which rotatably engages a stationary bearing member supported on the tube sheet at three points.

Similar equipment is known in which the arc welding head carries a tungsten electrode with welding wire and inert gas. The bearing of the spindle member in this known system, is mounted on a stand which, after the coaxial position has been set by the centering pin, is attached to the tube sheet through electro magnets.

Some of the problems encountered with this known system involves welding austenitic steels. Due to the paramagnetic properties of an austenitic sheet, the electro magnetic attachment fails to hold to the sheet, and the magnetic flux crosses through the hole and extinguishes the arc.

An additional problem involves the circular movement of the welding electrode. Because the thrust bearing of the spindle is supported at a large distance from the tube sheet, the circular movement of the electrode is inaccurate, that is, a small play in the bearing is transferred to the motion of the electrode with large amplification.

It is, therefore, the object of this invention to provide a welding apparatus which can be easily aligned with a tube sheet aperture fixed in position on all tube sheets and at the same time will have an improved accuracy of the circular motion of the electrode.

According to the invention, the rotating spindle is provided with two thrust bearings at each end of the spindle with a clamping device arranged between the bearings. The outboard bearing ring of one, the first, thrust bearing, is mounted on a moveable support frame in such a way as to only allow motion parallel to the tube sheet. The second thrust bearing is ring shaped having on its support ring three spiked conical projections uniformly spaced on the circumference of the support ring. The spiked points of these three projections are directed axially toward the tube sheet. The thrust bearings are of known construction and serve to prevent lengthwise motion. In the unlocked position of the clamping device the second thrust bearing support ring may have a slight radial clearance which disappears when an axial force is applied.

Coaxial alignment of the spindle and bearings with the tube opening is obtained in the following manner. The clamping device porvides a means to change the length of the spindle and, therefore, the distance between the two thrust bearings. Because the first thrust bearing is attached to the support, a shortening of the spindle length only moves the second thrust bearing. By moving the spindle along the support frame, a hole in the tube sheet can be generally aligned with the axis of the second, ring shaped, thrust bearing. A centering pin coaxial with the spindle and thrust bearings is inserted into the edge of the hole. The distance between the two bearings is extended, and the second bearing is moved closer to the tube sheet until the spikes of the three conical projections in the support ring of the second thrust bearing touch the tube sheet. When the bearing is fully supported on the tube sheet it assumes a concentric position relative to the edge of the hole within the tolerance of the bearing clearance.

A further actuation of the clamping device presses the spindle against the support frame and exerts pressure through the cone spikes to the tube sheet. This pressure casues all three spikes to bear on the tube sheet and, therefore, coaxially sets the axes of the bearing ring and the hole. This pressure also causes the spikes to slightly penetrate into the material of the tube sheet thus securing the support ring of the second thrust bearing to the tube sheet. Furthermore, the pressure causes the spindle to coaxially align itself with the hole due to the mobility of the first thrust bearing along the support frame and because the second thrust bearing is co-axially fixed with the hole on the tube sheet. Finally, the pressure removes any clearance from the second thrust bearing.

Thereafter, the clamping device is locked in position and the centering pin is retracted from the tube opening in order to provide the welding head with access to the upper edge thereof. The welding head which was turned aside during the centering operation is swung into the welding position, the arc is struck, and the spindle is rotated automatically until the welding is completed. The resulting circular motion of the electrode is guided by the large ring of the second thrust bearing which improves the circular guidance of the electrode. During this time, the locked clamping device exerts a pressure against the support frame and the tube sheet so that the outer bearing support ring remains solidly fixed in position, and the thrust bearings operate in a clearance free condition. Also, the freedom of movement of the first bearing support along the support frame prevents the possibility of transmitting any vibration in a direction parallel to the tube sheet. Furthermore, axial vibrations or shocks cannot be transmitted to the welding head because the bearing support ring is securely fixed to the tube sheet and the bearing is clearance free.

It is possible in the practice of this invention to use roller bearings instead of ball bearings.

During the centering process, especially when the spindle is in a horizontal position with a light pressure being applied to the clamping device, it is possible for one of the spikes on the support ring of the second bearing to prematurely affix itself to the tube sheet before the bearing becomes clearance free. This premature joining of the spike and the tube sheet makes it difficult for the support ring to glide along the tube sheet to a concentric position with the tube hole. To improve this centering process, it is possible in the practice of this invention to use a conically shaped race, preferably at a 45° inclination and a rounded grooved second support ring for use with ball bearings. With this conically shaped race and a light pressure from the clamping device, the outer ring of the thrust bearing will align itself parallel to the tube sheet, and the spindle, which has its centering pin inserted in the hole, will concentrically and coaxially align with the perpendicular drilled tube opening. An explanation for this concentric alignment is that the balls of the loaded bearing in the grooved support race are spaced along a certain circular path. However, the balls cannot support a load unless they also touch the conical race surface. Therefore, an axial force on the outer bearing race can be transferred to the inner support ring only when the points of contact of the balls in the conical race are on a circular path coaxial with the circular path in the grooved race. Such a position of the two bearing races can be achieved only when there is no clearance in the radial and axial directions. Until this occurs there is no possibility that an axial pressure can be transferred to any of the three spikes that would cause one of the spikes to bite into the tube sheet. Therefore, the spikes can glide on the tube sheet until the radial clearance disappears entirely. With the centering pin inserted in the tube opening, the radial and the axial clearances disappear simultaneously at the moment when all three spikes touch the tube sheet at this time the outer bearing ring obtains a coaxial position with the hole, and the spindle also aligns coaxially with the hole due to it coaxial position with the outer thrust bearing ring. A strong actuation of the clamping device causes the three spikes to equally penetrate the tube sheet and to fix the position of the outer ring of the thrust bearing.

Through the bracing of the clamping device the spindle is held in a coaxial position with the hole during welding. This is explained from the fact that the coaxial alignment of the outer bearing ring on the tube sheet is already completed; the pressure exerted by the clamping device does not permit a clearance within the second thrust bearing; only an axial clearance can permit the spindle to swing out of coaxial position; the points of contact of the balls would then lie path on an eliptical path, and the shape of the groove and the pressure does not permit any other path but circular.

In the practice of the invention, the spindle can be connected to the ring of the second thrust bearing with legs in the form of a tripod so that enough space is available between the legs to position the welding head, cables, and welding wire and to obtain better visibility.

The clamping device may be a turning sleeve, such as a turnbuckle with internal selfbreaking left and right threads. Therefore, the spindle divided perpendicularly to its axis, with each part having an external thread to fit into the sleeve, will shorten or elongate the spindle between the two thrust bearings.

The welding head may be attached to the spindle through a swing arm connected at two points, a hinge and an adjustment device for setting the welding head working position, with the spindle. A detail according to the invention is that the hinge is arranged on the opposite side of the adjustment device relative to the spindle axis. A spring connects the swing arm to the spindle in such a way that the swing arm is firmly held against the adjustment device by the spring tension. In order to save space, the working position of the welding head locates the swing arm across and to the front of the retracted centering pin. As the centering pin moves towards the hole, the pin pushes the swing arm aside, whereas during the retraction of the centering pin, the spring pulls the swing arm into the working position.

The outer beater ring of the first thrust bearing is attached to the support frame through intermediate elements and two pairs of rails which are arranged in a plane parallel to the tube sheet. The first pair of rails is horizontally attached to the support frame, and by means of rollers, guides the first intermediate element. A second pair of rails is attached vertically to the first intermediate element. A second intermediate element to which the first bearing is attached is guided by ball slides on the second pair of rails.

The rail pairs have a certain amount of elasticity and through the rolling attachment of the intermediate element along the rails a free movement of the first bearing parallel to the tube sheet is achieved. The arrangement of horizontal and vertical rails is especially well suited for welding of horizontal tubes into holes of vertically oriented tubes sheets. In this case it is advantageous to mount the spindle drive on the second intermediate element and to counter balance the weight of the entire load, associated wiith the spindle, by a counter weight. For this purpose, the second intermediate element is connected to the counter weight by a cable and pulley arrangement. The weight of long spindles, used in welding tubes to tube sheets located deep within heat exchangers, may be similarly supported.

An example of the application of the invention is illustrated on the attached drawings and is described in the following paragraphs.

The drawings show a part of the tube sheet A made of austenitic steel and, for clarity, one tube B out of many tubes of the bundle, which is to be welded inside the tube opening with a circular stitch at location C. The weld is made with an electric arc which is struck by a tungsten electrode D attached to a welding head E. The electric current, the inert gas and a cooling medium is supplied to the welding head through lead-ins located in flexible hose F and a device 10 automatically feeds the welding wire. The welding head is attached to a spindle G that provides an automatic circular motion to the electrode. The spindle is mounted in bearings and is rotated by a motor.

The bearings for the spindle G consist of a first thrust bearing H and a second thrust bearing J. A sliding centering pin K is provided for coaxial alignment of the spindle G to the opening in which the tube B is located. The tube B is part of a large heat exchanger tube bundle to be welded in the tube sheet in a horizontal position. The tube shown is at the edge of the tube sheet A where the space conditions are cramped due to a cylindrical projection of the tube sheet. The projection is part of the wall of the inlet box to the heat exchanger.

Figure 1:
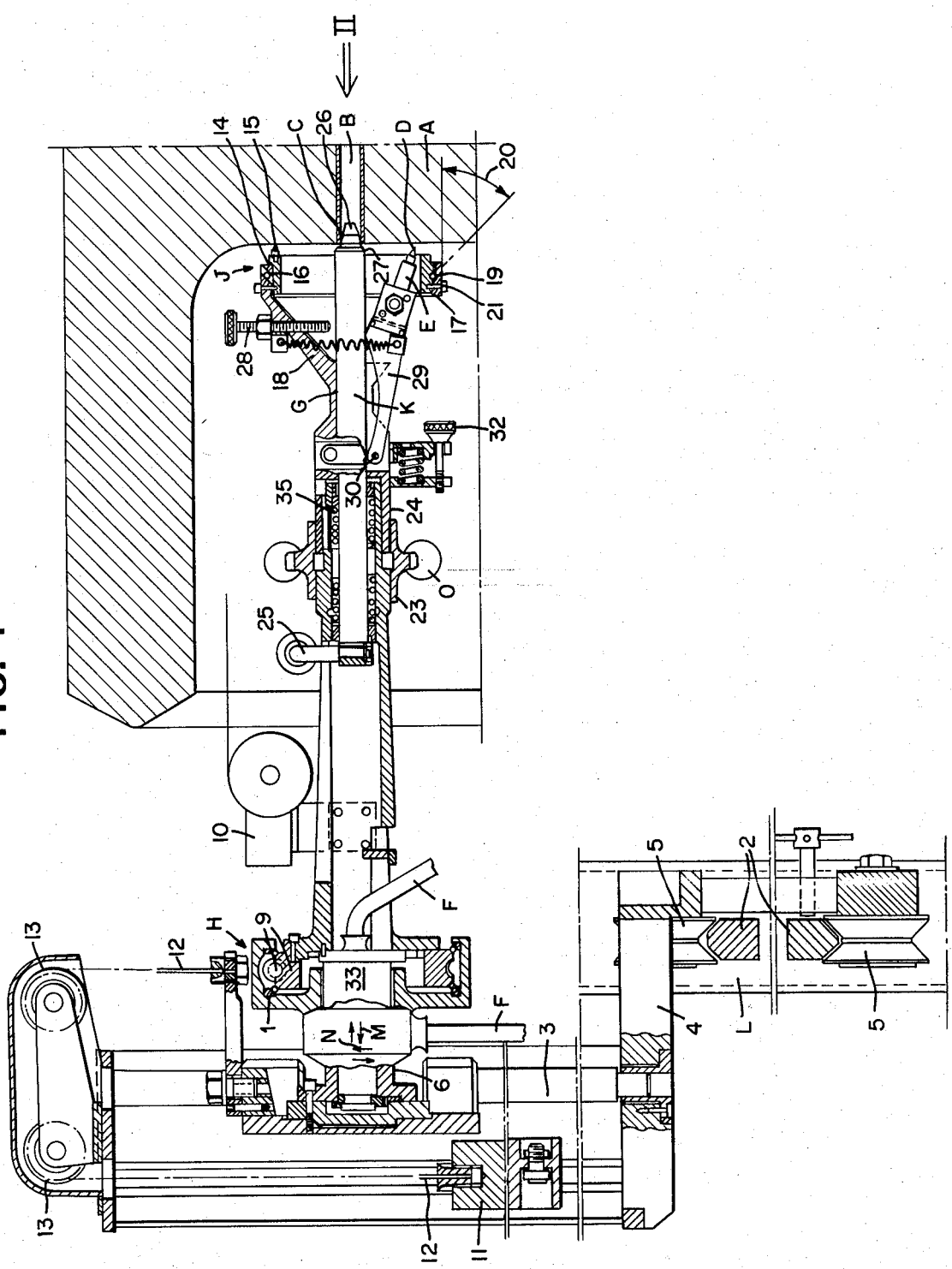
FIG. 1 shows a side view of the equipment partially in section.
Figure 2:
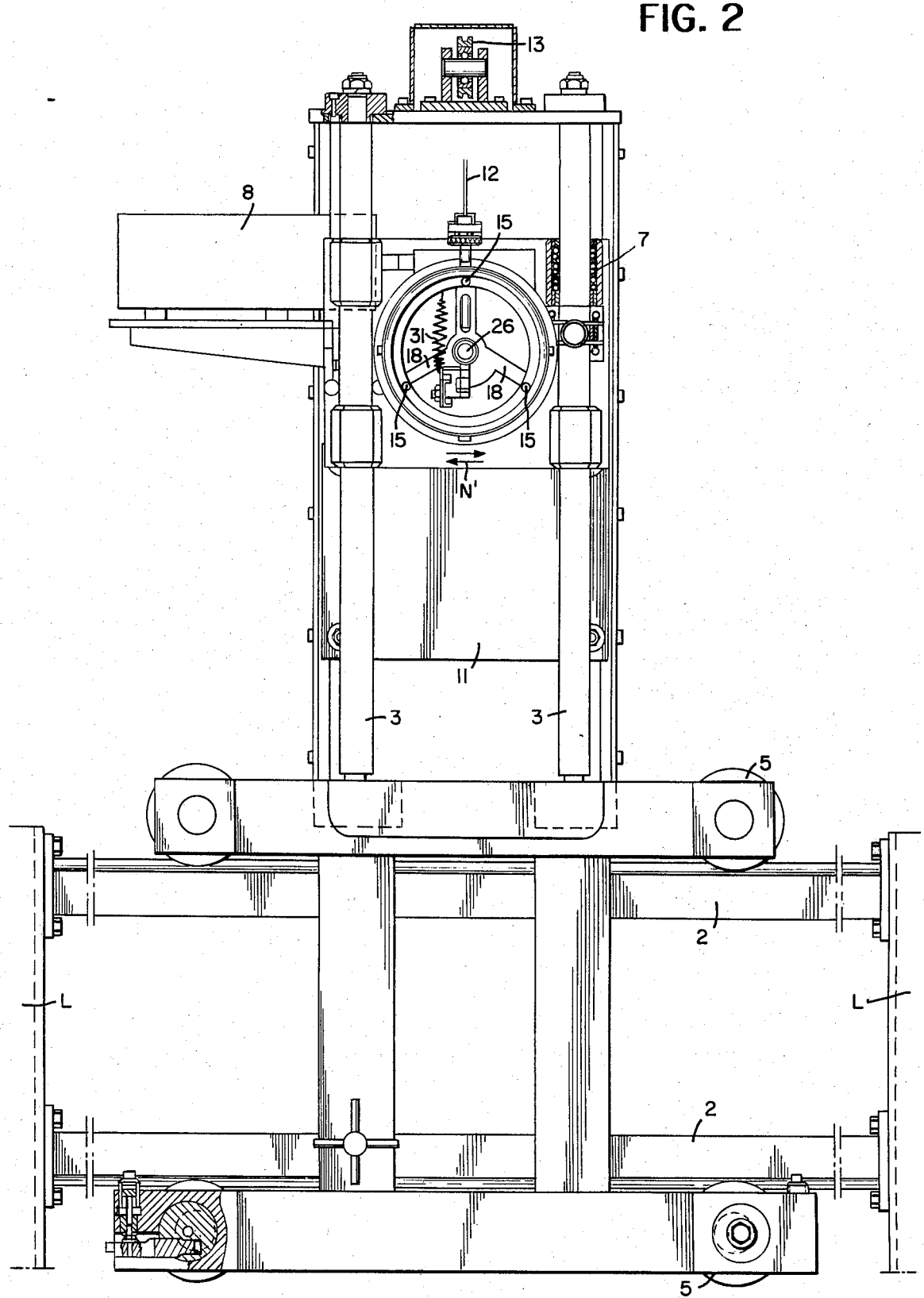
FIG. 2 shows a view in the direction of arrow II of FIG. 1 with the tube sheet removed.

FIGS. 1 and 2 show two supports L of a support frame (not shown) which is stationary relative to the tube sheet A and is removed after all of the tubes are welded.

The spindle G is connected to the support L of the support frame in such a manner as to be freely moveable in the horizontal and vertical directions parallel to the tube sheet face, as indicated by the arrows N and N' in FIGS. 1 and 2 respectively. Movement in the direction perpendicular to the plane of the tube sheet face, as indicated by arrows M is restricted by the support frame.

The freedom of movement in the arrow directions N and N' is provided through two pairs of rails 2 and 3 which are parallel to the tube sheet A. The first pair of rails 2 is horizontally attached to the support L and guides a first intermediate element 4 on rollers 5. The second pair of rails 3 is vertically attached to the first intermediate element 4 and guides a second intermediate element 6 through slide ball bushings. The outer ring 1 of the first thrust bearing H is mounted on the second intermediate element 6. The support frame and the guiding of the two intermediate elements 4, 6 along the two pairs of rails 2, 3 insures a free movement of the first thrust bearing H in the plane parallel to the tube face and no motion in a direction out of this plane.

A motor 8 mounted on the second intermediate element 6 drives a worm gear 9 which turns the spindle G and the electrode D. The second intermediate element 6 is connected to a counterweight 11 through a cable 12 and pulleys 13. The counterweight transfers the weight of the spindle G to support L of the support frame, in order that the second intermediate element 6 is freely floating along the rail pair 3 while the spindle is in a horizontal position.

The second thrust bearing J is made in the shape of a ring in order that there is free access to the tube sheet A through the bearing. The outer ring 14 of the bearing has three conical projections, spikes, 15 having the tips thereof directed towards the tube sheet A. The spikes are made of hard steel in the form of short screws threaded into the outer bearing ring 14. Due to the short length of the spikes, the bearing ring 14 is advantageously located very close to the tube sheet A.

The second thrust bearing has a rounded circular ball race 16 on the outer ring 14. The bearing ring 17 is connected to the spindle G through three legs 18 which are arranged in the form of a tripod. In this model of the invention, the shape of the ball race 19 for the bearing ring 17 is conical, with a cone angle 20 of 45° to the bearing axis. Furthermore, the bearing ring 17 has on its circumference several screws 21 which project into a groove 22 in the bearing ring 14 to keep the parts of the thrust bearing J together.

A clamping device O is arranged between the two thrust bearings H and J. It consists of a turning sleeve 23 with internal left and right threads. The spindle G is divided perpendicularly to its longitudinal axis, and the ends of the spindle is threaded into one side of sleeve 23 and the other end of the spindle is threaded into the other end of the sleeve. In this way, turning the sleeve 23 in one direction causes the spindle to shorten, while turning the sleeve in the opposite direction elongates the spindle. In this manner, the distance between the two thrust bearings, H and J, is increased or decreased. However, bearing ring 1 of the thrust bearing H is attached to the support frame so that its distance from the tube sheet remains constant, therefore, by turning the sleeve 23 only that part of the spindle attached to the second thrust bearing J moves in the direction perpendicular to the plane of the tube sheet A.

Figure 3:
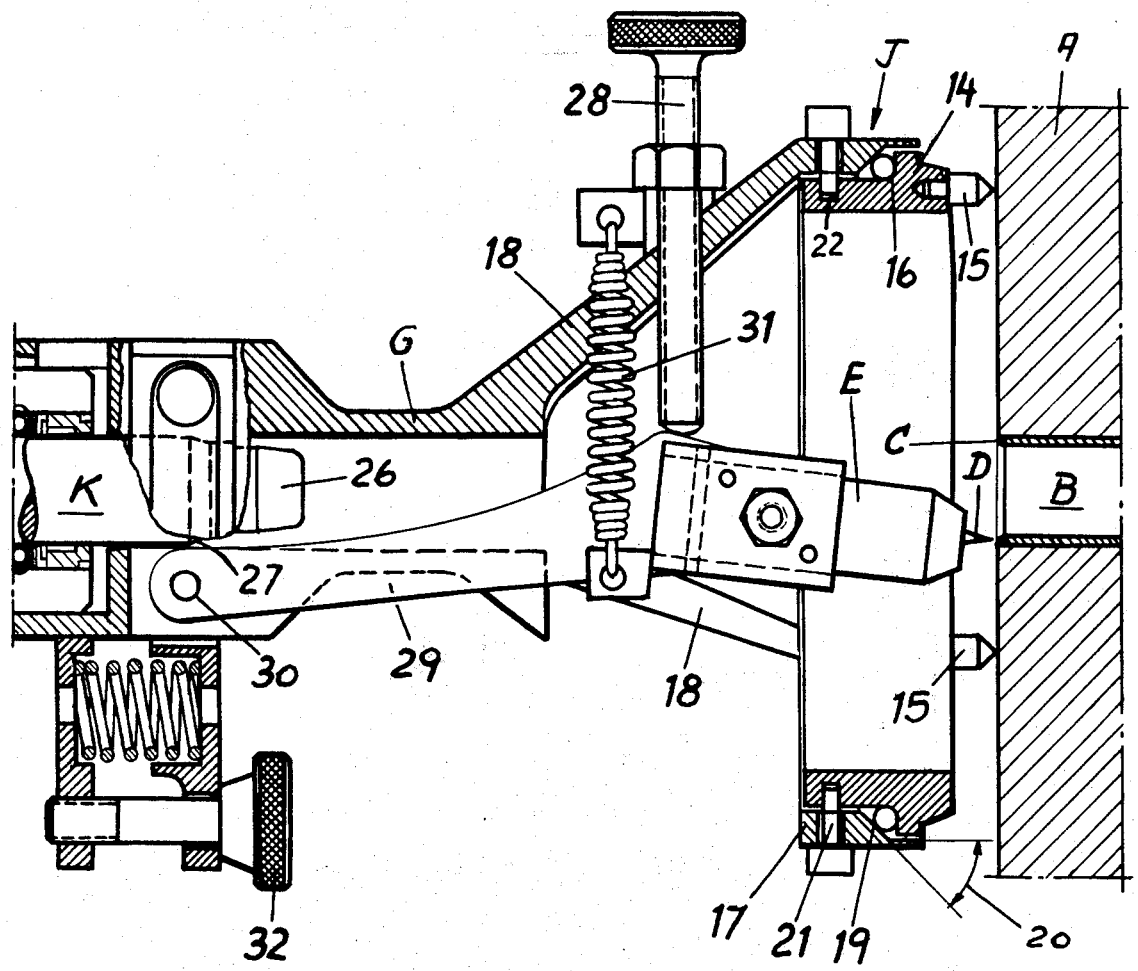
FIG. 3 shows a partial section corresponding to FIG. 1.

The adjustment of the radius for the circular motion of the electrode is accomplished by an adjustment screw inserted into a thread tapped in the spindle G. A swing arm 29 attached to the spindle through a hinge 30 and a spring 31. The spring 31 pulls the swing arm 29 against the adjustment screw 28 (FIG. 3) into the welding position. The hinge 30 is located on the opposite side of the adjustment screw 28 in relation to the spindle axis.

Within the spindle, G, is a centering pin K which is moved, by means of a projecting grip 25 at its outer end, in the direction perpendicular to or away from the tube sheet, as desired. The pin K is held concentric with the spindle G by a pair of so called linear bearings 35 which permit its easy longitudinal movement within the spindles. When the centering pin is advanced towards the tube sheet, the welding head arm 29 is displaced to one side against the bias of the spring 31, which returns the arm to its orginial position when the centering pin is retracted. The centering pin has a frusto conical surface 26 at its inner extremity which facilitates the advancement of the pin into the tube end in the tube sheet hole, and it also has a larger diameter frusto conical surface 27 more remote from the surface 26 adapted to engage the circular edge of the tube sheet hole.

The alignment of the welding head proceeds in the following manner. The spikes 5 are moved perpendicularly away from the tube sheet A and the second thrust bearing J is moved parallel to the tube sheet until the desired tube hole appears in its center. Actuating the cam 25, the centering pin K is inserted into the tube hole so that the centering pins cone surface 27 fits tightly in the hole. During the movement of the centering pin K the swing arm is temporarily pushed aside. Turning the clamping device O exerts a light pressure on the first thrust bearing H and on the support member L while at the same time the spikes 15 touch the tube sheet A. Due to the conical shape of the ball race 19 the outer bearing ring 14 glides along the tube sheet into a concentric position with the centering pin K. The obtained alignment with the hole is very accurate because the distance of the ball bearing race 19 from the tube sheet is small and because the process of alignment is completed at the moment when the second thrust bearing J becomes clearance free. At that moment all balls of the bearing are touching the rounded race 16 and the conical race 19. Only at this moment is the second thrust bearing J capable of transmitting axial forces. With additional turning of the clamping device O, the spikes penetrate the material of the tube sheet A and fix the position of the bearing ring 14 on the tube sheet. Although the first thrust bearing can move in all directions parallel to the tube sheet, the bearing ring 14 of the thrust bearing J keeps the spindle G in a coaxial position with the hole and the tube B as long as the clamping device O is under pressure.

While the clamping device O is under pressure, the centering pin K is retracted, and the welding head E swings into its working position automatically under the action of the spring 31. The proper radius for the circular motion of the electrode D is adjusted by the screw 28, and the distance of the electrode from the face of the tube B is adjusted by the adjustment screw 32 which acts on the hinge 30 of the swing arm 29. Welding is performed in this position.

For welding, an electric arc is struck and the spindle is rotated through a worm gear drive 9. The electric current, the inert gas and a cooling medium are supplied to the welding head E through conduits (not shown) located inside a flexible hose F. A known type of rotating fitting 33 is provided to avoid interference of the flexible hose F with the rotating movement of the spindle G and to supply a constant communication between the conduits and the welding head.

The circular motion of the electrode D during welding is established by the rotation of the spindle G and the second thrust bearing J.

The embodiments of the invention in which an exclusive property or privilege is claimed are defined as follows:

1. A welding apparatus for use in making orbital welds at the junction of a tube and tube sheet and having a rotatable welding head, the improvement comprising means for positively positioning the welding head with respect to the intended welding path, said means including rotatable and stationary members, and each of said members having a bearing surface disposed in spaced surrounding relation to the welding head, one of said surfaces being inclined with respect to the central axis of the rotating member, bearing means interposed between said surfaces, and means for mounting the welding head on said rotatable member, said stationary member having means projecting therefrom for contacting the tube sheet, and said rotatable member including a hollow spindle, a normally retracted centering pin housed in said spindle, means for inserting the pin into said tube when aligning the rotatable member therewith, means for applying pressure through the rotatable member, and means independent of said stationary member and adapted for supporting the rotatable member during alignment and thereafter sustaining the pressure therethrough, said pressure giving rise to a centering action between the rotatable and stationary members while maintaining the projecting means engaged with said tube sheet.

2. The welding apparatus in accordance with claim 1 wherein the other of said surfaces is concave.

3. The welding apparatus in accordance with claim 1 wherein said mounting means includes a support arm, said arm being pivotally attached to the rotatable member.

4. The welding apparatus in accordance with claim 1 wherein said spindle is formed of two axially aligned sections, and the means for applying said pressure includes a turnbuckle interconnecting said sections.

* * * * *